US010525699B2

(12) United States Patent
Imai et al.

(10) Patent No.: US 10,525,699 B2
(45) Date of Patent: Jan. 7, 2020

(54) TABLET PRINTING DEVICE (71) Applicant: FREUND CORPORATION, Tokyo (JP)

(72) Inventors: Kiyoshi Imai, Tokyo (JP); Satoshi Murakami, Tokyo (JP); Mutsuhito Yoneta, Tokyo (JP); Yoshito Saji, Tokyo (JP)

(73) Assignee: FREUND CORPORATION, Tokyo (JP)

(*) Notice: Subject to any disclaimer, the term of this patent is extended or adjusted under 35 U.S.C. 154(b) by 5 days.

(21) Appl. No.: 15/752,759

(22) PCT Filed: Aug. 1, 2016

(86) PCT No.: PCT/JP2016/072527
§ 371 (c)(1),
(2) Date: Feb. 14, 2018

(87) PCT Pub. No.: WO2017/029974
PCT Pub. Date: Feb. 23, 2017

(65) Prior Publication Data
US 2018/0236760 A1 Aug. 23, 2018

(30) Foreign Application Priority Data

Aug. 19, 2015 (JP) .................. 2015-161580
Feb. 10, 2016 (JP) .................. 2016-023350

(51) Int. Cl.
B41F 17/36 (2006.01)
A61J 3/00 (2006.01)
A61J 3/10 (2006.01)
B41J 3/407 (2006.01)
B41J 11/00 (2006.01)
(Continued)

(52) U.S. Cl.
CPC ............... B41F 17/36 (2013.01); A61J 3/007 (2013.01); A61J 3/10 (2013.01); B41J 3/407 (2013.01); B41J 11/0085 (2013.01)

(58) Field of Classification Search
CPC ...... B41J 3/407; B41J 3/4073; B41J 11/0085; A61J 3/007; B41F 17/34; B41F 17/36
(Continued)

(56) References Cited

U.S. PATENT DOCUMENTS 3,802,340 A * 4/1974 Braun .................. B41F 17/36
101/37
4,189,996 A * 2/1980 Ackley, Sr. ............ B41F 17/36
101/37
(Continued)

FOREIGN PATENT DOCUMENTS

JP 2000-97865 4/2000
JP 2001-130749 5/2001
(Continued)

OTHER PUBLICATIONS

International Preliminary Report on Patentability dated Feb. 20, 2018 in International (PCT) Application No. PCT/JP2016/072527.
(Continued)

Primary Examiner — Leslie J Evanisko
(74) Attorney, Agent, or Firm — Wenderoth, Lind & Ponack, L.L.P.

(57) ABSTRACT

A tablet printing device includes a first conveying disk that conveys a tablet while sucking and supporting a side surface of the tablet and an inkjet head capable of applying print processing to the front and back surfaces of the tablet conveyed by the conveying disk. The tablet is conveyed while being supported by a second conveying disk at its front and back surfaces and subjected to inspection of the side surface by a side surface inspection device. The tablet is transferred from the second conveying disk to the first conveying disk at a tablet delivery part and then supported by a suction hole formed in an end surface of the first conveying disk with the front and back surfaces fully exposed. The front and back surfaces are subjected to print
(Continued)

processing ead, followed by print inspection, and only a non-defective tablet is discharged through a non-defective tablet discharge part.

5 Claims, 8 Drawing Sheets

(58) Field of Classification Search
USPC .................................................... 101/35, 41
See application file for complete search history.

(56) References Cited

U.S. PATENT DOCUMENTS

2006/0278104 A1* 12/2006 Boyce ..................... B41F 17/36
101/35

2011/0128557 A1 6/2011 Kinoshita et al.
2015/0191028 A1* 7/2015 Hara ........................ B41J 3/407
347/104

FOREIGN PATENT DOCUMENTS

| JP | 2010-260691 | 11/2010 |
| JP | 5281009 | 5/2013 |
| JP | 2013-121432 | 6/2013 |
| WO | 2011/117983 | 9/2011 |
| WO | 2015/008505 | 1/2015 |

OTHER PUBLICATIONS

International Search Report dated Sep. 13, 2016 in International (PCT) Application No. PCT/JP2016/072527.

* cited by examiner

TABLET PRINTING DEVICE

TECHNICAL FIELD

The present invention relates to a tablet printing device that prints a product number, a product name, a trademark, or the like on the surface of a tablet or a capsule and, more particularly, to a tablet printing device capable of performing printing for a tablet in a non-contact manner.

BACKGROUND ART

A product number, a product name, a trademark or the like is displayed on the surface of a tablet or a capsule (hereinafter, referred to collectively as "tablet") for identification of a product and prevention of accidental ingestion. The display on the tablet is made by engraving at tabletting or print processing such as transfer printing or inkjet printing. The inkjet printing is capable of performing printing on the tablet surface in a non-contact manner and is thus less subject to powder adhering to irregularity in the tablet surface and excellent in sanitation. Thus, in recent years, various types of inkjet type tablet printing devices are proposed. For example, in a tablet printing device disclosed in Patent Document 1, a tablet is conveyed by a conveyor belt with one surface (lower surface) of the tablet sucked and held, and predetermined print processing is performed on the other surface (upper surface) thereof by an inkjet head disposed on the conveying path.

CITATION LIST

Patent Document

Patent Document 1: Japanese Patent No. 5,281,009
Patent Document 2: International Publication No. WO 2015/008505
Patent Document 3: JP 2000-97865 A
Patent Document 4: JP 2010-260691 A
Patent Document 5: JP 2001-130749 A

DISCLOSURE OF THE INVENTION

Problems to be Solved by the Invention

In a tablet printing device like the one disclosed in Patent Document 1, when printing is performed on both surfaces of the tablet, the print surface of the tablet needs to be switched by reversing the tablet. In this case, the reversal of the tablet is made by transfer of the tablet from one conveying unit (e.g., a conveyor belt or a disk) to another. That is, the tablet conveyed by a first belt and subjected to printing on one surface thereof is transferred to a second belt with the other surface facing upward and then subjected to printing on the other surface. However, in the aforementioned configuration, it is difficult to make the direction of characters printed on the front surface and the direction of characters printed on the back surface coincide with each other on one tablet. Further, at the reversal of the tablet, an undried print surface may be brought into contact with a conveying unit at the rear stage, causing ink to adhere the conveying unit, which may cause the ink to be transferred onto another tablet or produce print blurring. In addition, a printing section for front surface and a printing section for back surface need to be provided in a single device, causing complication of the structure and increase in size of the device.

In a device disclosed in Patent Document 2, a tablet is housed in a magazine to allow both surfaces thereof to be subjected to printing at the same time, so that the above-mentioned problem concerning the direction of characters and the ink transfer does not arise. However, the magazine needs to be washed every time a series of print processing is ended. Further, the magazine is positioned between a print head and a tablet, so that the head cannot be brought closer to the tablet than a certain distance, limiting print quality. Furthermore, the tablet housing part of the magazine has a guide to be engaged with the tablet so as to house and hold the same in the magazine. Thus, a part of the tablet surface is hidden by the guide for tablet support, so that print processing cannot be applied to the entire print surface of the tablet. In addition, the guide to be engaged with the tablet needs to be modified depending on the dimension of tablet.

Means for Solving the Problems

A tablet printing device according to the present invention includes a conveying unit that conveys a tablet while sucking and supporting the side surface of the tablet and a printing unit that is disposed in proximity to the conveying unit and capable of applying print processing to at least one of the front and back surfaces of the tablet conveyed by the conveying unit.

In the present invention, print processing is performed while sucking and supporting the side surface of the tablet, so that inspection or print processing can be performed with the front and back surfaces of the tablet exposed. Further, print processing can be applied to both the front and back surfaces of the tablet on the conveying unit without the need to reverse the tablet.

In the tablet printing device, the side surface of the tablet may be sucked to and supported by the conveying unit such that the front and back surfaces of the tablet are each fully exposed. This allows inspection or print processing to be performed with the print surface of the tablet kept fully exposed, so that the tablet has no area where inspection or printing cannot be applied. Further, as the printing unit, a unit capable of applying printing to the front and back surfaces of the tablet at the same time may be used. As a result, it possible to enhance efficiency of print processing by making the most of the features of the present invention that the front and back surfaces of the tablet can be subjected to print processing at a time without the need to reverse the tablet.

Further, a conveying disk formed into a disk shape may be used as the conveying unit, and suction parts for sucking the side surface of the tablet may be formed in the end surface of the conveying disk in the peripheral direction.

The tablet printing device may further include a tablet feeding part connected to a tablet feeding unit and receives the tablet from the tablet feeding unit. The conveying disk may include a first conveying disk that is disposed so as to face the tablet feeding part and conveys the tablet while sucking one of the front and back surfaces of the tablet and a second conveying disk that is provided in proximity to the first conveying disk such that the end surface thereof adjacently faces the end surface of the first conveying disk and conveys the tablet while sucking the side surface of the tablet. A tablet delivery part at which the tablet is transferred from the first conveying disk to the second conveying disk may be provided between the first and second conveying disks.

Further, a tablet feeding disk that conveys the tablet while sucking the side surface of the tablet may be provided as the tablet feeding unit. The tablet feeding disk may be configured to suck the tablet at a tablet acquisition part and to convey the tablet to the tablet feeding part in a horizontal posture. In this case, a tablet delivery part at which the tablet is transferred from the tablet feeding disk to the first conveying disk may be provided between the tablet feeding disk and the first conveying disk.

In addition, the tablet printing device may further include a print surface inspection device capable of detecting a score line formed on the tablet. The printing unit may apply print processing to the front and back surfaces of the tablet such that the direction of characters printed on the front surface of the tablet and that printed on the back surface coincide with each other according to the direction of the score line detected by the print surface inspection device.

Advantages of the Invention

According to the tablet printing device of the present invention, print processing is performed while sucking and supporting the side surface of the tablet, so that inspection or print processing can be performed with the front and back surfaces of the tablet kept exposed. Further, print processing can be applied to both the front and back surfaces of the tablet on the conveying unit, so that the front and back surfaces can be subjected to print processing at a time without the need to reverse the tablet, thereby eliminating a risk of ink transfer or print blurring associated with the reversal of the tablet. Further, both surfaces of the tablet can be subjected to printing at the same time, so that the directions of characters printed on the front and back surfaces can be made to coincide with each other.

BEST MODE FOR CARRYING OUT THE INVENTION

Hereinafter, embodiments of the present invention will be described. The object of the embodiments described below is to provide an inkjet type tablet printing device capable of performing printing on the entire print surface of both the front and back of the tablet without causing any ink transfer or print blurring.

(First Embodiment)

Figure 1:
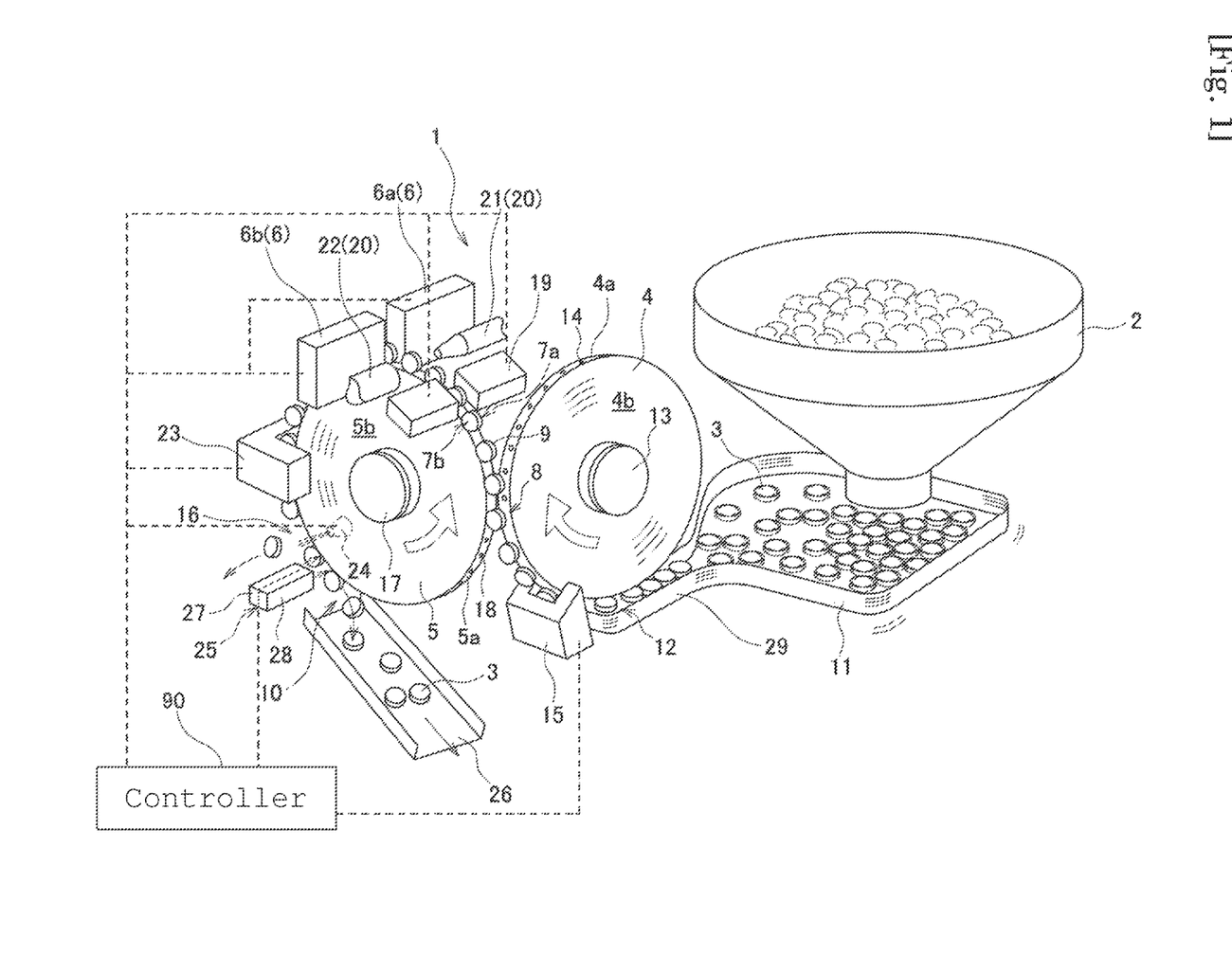
FIG. 1 is an explanatory view illustrating the entire configuration of a tablet printing device according to a first embodiment of the present invention.

FIG. 1 is an explanatory view illustrating the entire configuration of a tablet printing device 1 according to a first embodiment of the present invention. The tablet printing device 1 of FIG. 1 sucks and conveys tablets 3 fed from a hopper 2 one by one with two conveying disks 4 and 5 and performs predetermined print processing on the front and back surfaces (print surfaces) 7a and 7b of each tablet 3 with an inkjet head 6. In the tablet printing device 1, the tablets 3 are transferred from the conveying disk 4 (first conveying disk) to the conveying disk 5 (second conveying disk) at a tablet delivery part 8. In the conveying disk 5, a side surface 9 of the tablet 3 is sucked to and supported by a disk end surface 5a. The tablet 3 is conveyed to the inkjet head 6 in a standing state (standing posture) where the side surface 9 is directed in the vertical direction. At the inkjet head 6, the front surface 7a and back surface 7b of the tablet 3 are subjected to printing at the same time, and only non-defective tablets are discharged outside the device through a non-defective tablet discharge part 10.

As illustrated in FIG. 1, the tablet printing device 1 is provided with the hopper 2 that stores and feeds the tablets 3. A vibration feeder (tablet feeder) 11 is provided below the hopper 2. The tablets 3 fed from the hopper 2 to vibration feeder 11 are fed in an aligned state to a tablet feeding part 12 while receiving vibration with one of the front and back surfaces 7a and 7b facing downward. The tablet feeding part 12 is provided with the disk-shaped conveying disk 4. The conveying disk 4 is rotated in a direction denoted by the arrow by a drive source (e.g., electric motor) (not illustrated) about a rotation axis 13. An end surface 4a of the conveying disk 4 has a flat surface with no projection. Circular suction holes 14 are formed in the disk end surface 4a in the peripheral direction. The suction holes 14 are connected to a suction device (not illustrated) such as a vacuum pump. The tablets 3 fed to the tablet feeding part 12 are sucked to the disk end surface 4a by the suction holes 14. At this time, each tablet 3 is held to the end surface 4a with one of the front and back surfaces 7a and 7b sucked thereto.

A side surface inspection device 15 is disposed near the conveying disk 4. The side surface inspection device 15 is used to inspect a state (presence/absence of cracking and chipping) of the side surface 9 of the tablet 3 sucked to and supported by the conveying disk 4 (side surface inspection). In the tablet printing device 1, a camera is used as the inspection device for inspecting the outer appearance or a printed state. An image photographed by the inspection device is sent to a controller 90, where determination of non-defective/defective is made. A light and a pair of prisms are provided in the photographing range of the camera used as the side surface inspection device 15. The pair of prisms are disposed so as to face the tablet side surface. The camera photographs a state of the tablet side surface illuminated by the light through the two prisms (180 degree area is covered by each prism). The side surface inspection device 15 can not only inspect the outer appearance of the tablet 3, but also measure the thickness thereof. That is, the side surface inspection device 15 can also determine the presence/absence of a dimensional defect. A tablet 3 in which any abnormality is detected is recognized as a defective one and discharged through a defective tablet discharge part 16 provided at the rear stage of the conveying disk 5 without being subjected to print processing.

The disk-shaped conveying disk 5 is provided at the rear stage of the conveying disk 4. The conveying disk 5 is rotated in a direction denoted by the arrow by a drive source (not illustrated) about a rotation axis 17. The conveying disks 4 and 5 are disposed such that the rotation axes 13 and 17 thereof are orthogonal to each other and are synchronously driven so as to convey the tablets at the same speed. Similarly to the conveying disk 4, an end surface 5a of the conveying disk 5 also has a flat surface with no projection and has circular suction holes (suction parts) 18 formed in the peripheral direction. The end surfaces 4a and 5a of the conveying disks 4 and 5 are disposed so as to adjacently face each other at the tablet delivery part 8 in an orthogonal state.

The tablet 3 is sucked to the end surface 4a of the conveying disk 4 at the tablet feeding part 12 and conveyed to the tablet delivery part 8 with rotation of the conveying disk 4. The tablet 3 conveyed to the tablet delivery part 8 is sucked to the end surface 5a of the conveying disk 5 there and is then transferred to the conveying disk 5. At the conveying disk 4 side, a suction force is imparted to the tablet 3 until the tablet 3 reaches a position at which both the disks 4 and 5 become closest to each other at the tablet delivery part 8. The tablet 3 is transferred from the suction hole 14 where the suction force is lost at the position where the two disks are closest to each other to the opposing suction hole 18 of the conveying disk 5, and the tablet 3 is transferred from the conveying disk 4 to the conveying disk 5.

The tablet 3 is sucked to the conveying disk 4 at one of its front and back surfaces 7a and 7b, so that the side surface 9 of the tablet 3 faces the end surface 5a of the conveying disk 5 at the tablet delivery part 8. Thus, at the conveying disk 5 side, the side surface 9 of the tablet 3 is sucked and, accordingly, the tablet 3 is held to the end surface 5a in a standing state. A clearance between the conveying disks 4 and 5 at the tablet delivery part 8 can be changed according to the size of the tablet 3 and is automatically adjusted by inputting the tablet size through a control panel.

Figure 6:
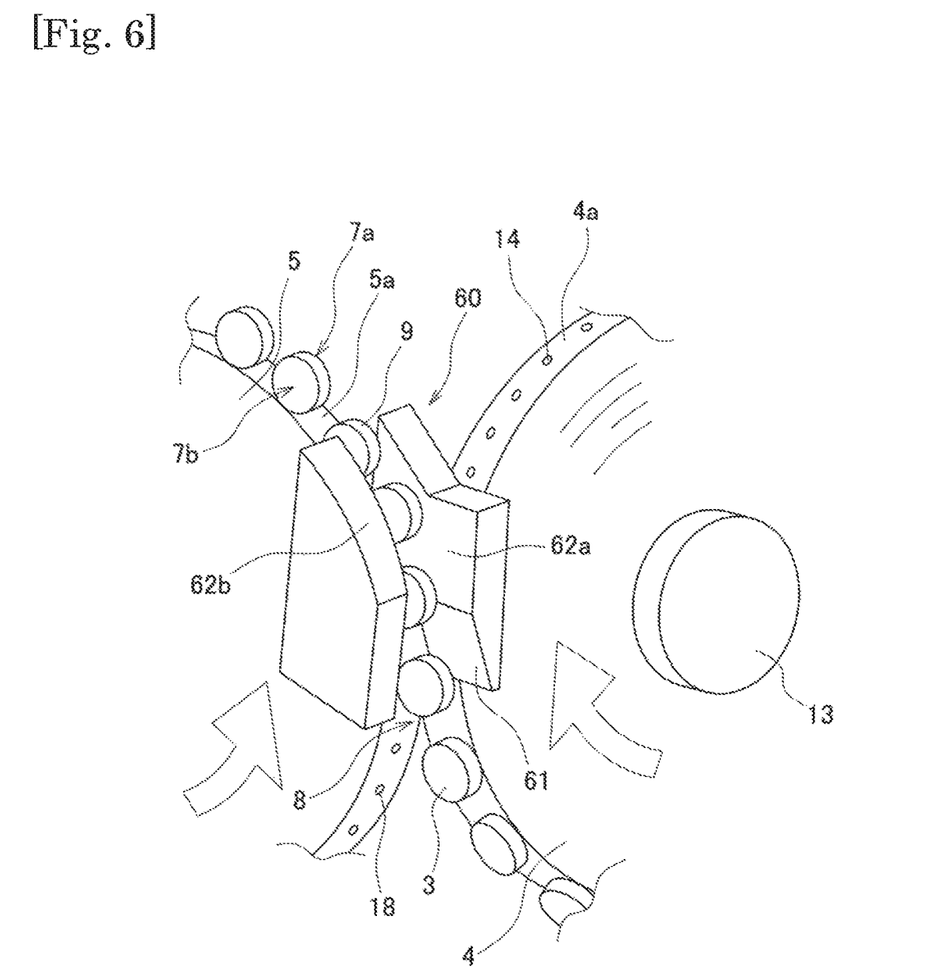
FIG. 6 is an explanatory view illustrating the configuration of a tablet delivery guide provided in a tablet delivery part.

The tablet delivery part 8 may be provided with a tablet delivery guide 60 as illustrated in FIG. 6. The tablet delivery guide 60 includes a removing part 61 and posture stabilizing guides 62a and 62b. The removing part 61 removes the tablet 3 sucked to the conveying disk 4 from the end surface 4a thereof. The posture stabilizing guides 62a and 62b guide the tablet 3 such that the tablet 3 transferred to the conveying disk 5 stands on the end surface 5a.

A print surface inspection device 19 is disposed at the rear stage of the tablet delivery part 8 in proximity to the conveying disk 5. The print surface inspection device 19 inspects the states of the front and back surfaces 7a and 7b of the tablet 3 sucked to and supported by the conveying disk 5 (print surface inspection). In the case of a scored tablet 3, the position of the score line is also detected by the print surface inspection device 19. As in the case of the side surface inspection device 15, a tablet 3 in which defective outer appearance is detected is recognized as a defective one and discharged through the defective tablet discharge part 16 without being subjected to print processing.

A powder removing device 20 and the inkjet head 6 are provided at the rear stage of the print surface inspection device 19. The powder removing device 20 blows compressed air to the tablet 3 from a nozzle 21 to remove powder adhering to the tablet surface immediately before printing. The powder blown off from the tablet surface is collected by a suction tube 22. Powder such as medicine adheres to the surface of a tablet formed by a tabletting machine. If print processing is applied to the tablet surface without removing the powder, the print may be erased from the tablet surface together with the powder, or print blurring may occur due to bleeding. To cope with this problem, in the tablet printing device 1, the powder removing device 20 is disposed immediately before the inkjet head 6. As a result, powder adhering to the surface of the tablet 3 is removed. In addition, print processing can be performed before generation of new powder. Thus, it is possible to prevent erasing or bleeding of the print by the powder adhering to the tablet surface, allowing for clear and high-quality printing.

The inkjet head 6 applies predetermined print processing to the front and back surfaces 7a and 7b of the tablet 3. At this time, the tablet 3 is supported with the side surface 9 sucked, and thus the front and back surfaces 7a and 7b are each fully exposed. Thus, in the tablet printing device 1, print processing can be applied to the entire surface of the tablet 3, so that the tablet 3 has no area where printing is unapplicable. Further, print processing can be applied to the front and back surfaces 7a and 7b at the same time. Furthermore, the direction of characters printed on the front surface 7a of the tablet 3 and the direction of characters printed on the back surface 7b thereof can be made to coincide with each other by the controller 90 according to the direction of the score line detected by the print surface inspection device 19. As described above, in the tablet printing device 1, desired print processing can be efficiently applied to the entire front and back surfaces of the tablet 3, thereby achieving improvement in degree of freedom of print design, and reduction in printing time and device size. The inkjet head 6 includes an inkjet head 6a for front surface and an inkjet head 6b for back surface and the inkjet head 6a and inkjet head 6b are disposed so as to face each other at the same position; however, they may be displaced from each other. Further, a plurality of heads may be provided for multicolor printing.

Further, in the tablet printing device 1, the tablet 3 is conveyed to the inkjet head 6 without using a conveying tool such as a magazine, while being sucked to and supported by the conveying disk 5. Thus, in the inkjet head 6, the tablet 3 can pass just near the head nozzle, allowing the distance between the head and the tablet to be reduced as much as possible. As a result, printing accuracy can be enhanced to allow higher quality tablet printing.

Further, in the inkjet head 6 of the tablet printing device 1, an ink ejection amount is adjusted according to the shape of the front and back surfaces 7a and 7b. Even when the print surface is curved, printing can be performed without distortion. For example, in the case of a tablet whose front and back surfaces are spherical, there is a difference between the distance between the center portion of the tablet and the head nozzle and the distance between the peripheral portion thereof and the head nozzle. Thus, if printing is performed under the same condition, distortion may occur in the peripheral portion. In order to cope with this problem, in the tablet printing device 1, the ejection amount of the head nozzle is adjusted based on shape information of the tablet so as to achieve easy-to-see printing free from distortion. While the shape information of the tablet can be input on a control panel of the device, thickness data of the tablet 3 measured by the side surface inspection device 15 can also be used.

A print inspection device 23 is provided at the rear stage of the inkjet head 6. The print inspection device 23 is provided to check a result of printing performed by the inkjet head 6. When a printing defect is detected by the print inspection device 23, the corresponding tablet is discharged through the defective tablet discharge part 16 at the rear stage of the print inspection device 23. The defective tablet discharge part 16 is provided with a jet nozzle 24 that blows compressed air. A tablet 3 determined to have a defect in outer appearance or printing is blown off from the conveying disk 5 by the air blown from the jet nozzle 24 to be removed.

A drying/cooling device 25 is provided at the rear stage of the defective tablet discharge part 16. When the tablet 3 is conveyed to the non-defective tablet discharge part 10 while the print surface is yet to be dried, the ink may adhere to a carrying-out path 26 or print blurring may occur. In order to cope with this problem, in the tablet printing device 1, the drying/cooling device 25 is provided at the front stage of the non-defective tablet discharge part 10 so as to dry the print surface and solidify the ink. The drying/cooling device 25 is provided with a heating nozzle 27 and a cooling nozzle 28. In the drying/cooling device 25, the solvent of the ink is vaporized by hot air from the heating nozzle 27, and then the ink is cooled to the melting point or lower thereof for solidification. Then, the print is fixed to the tablet surface, and only tablets 3 determined to be non-defective are discharged through the non-defective tablet discharge part 10. As a result, it is possible to prevent the tablets determined to be non-defective from being contaminated by ink adhering to the carrying-out path 26 and to prevent print blurring due to rubbing of the print surface against the carrying-out path 26 when the tablets 3 flow down on the carrying-out path 26, thereby improving product quality and yield.

As described above, in the tablet printing device 1 according to the present invention, print processing is performed while sucking and supporting the side surface 9 of the tablet 3, so that the front and back surfaces 7*a* and 7*b* of the tablet 3 are not covered with the guide for supporting the tablet. This allows inspection or print processing to be performed in a state where the print surface is fully exposed, and prevents an area where inspection or print processing cannot be applied from being generated. Further, both the front and back surfaces can be subjected to printing without involving reversal of the tablet 3, thereby eliminating a risk of ink transfer or print blurring associated with the reversal of the tablet. Further, the both surfaces of the tablet 3 can be subjected to printing at the same time, so that the directions of characters printed on the front and back surfaces 7*a* and 7*b* can be made to coincide with each other.

(Second Embodiment)

Figure 2:
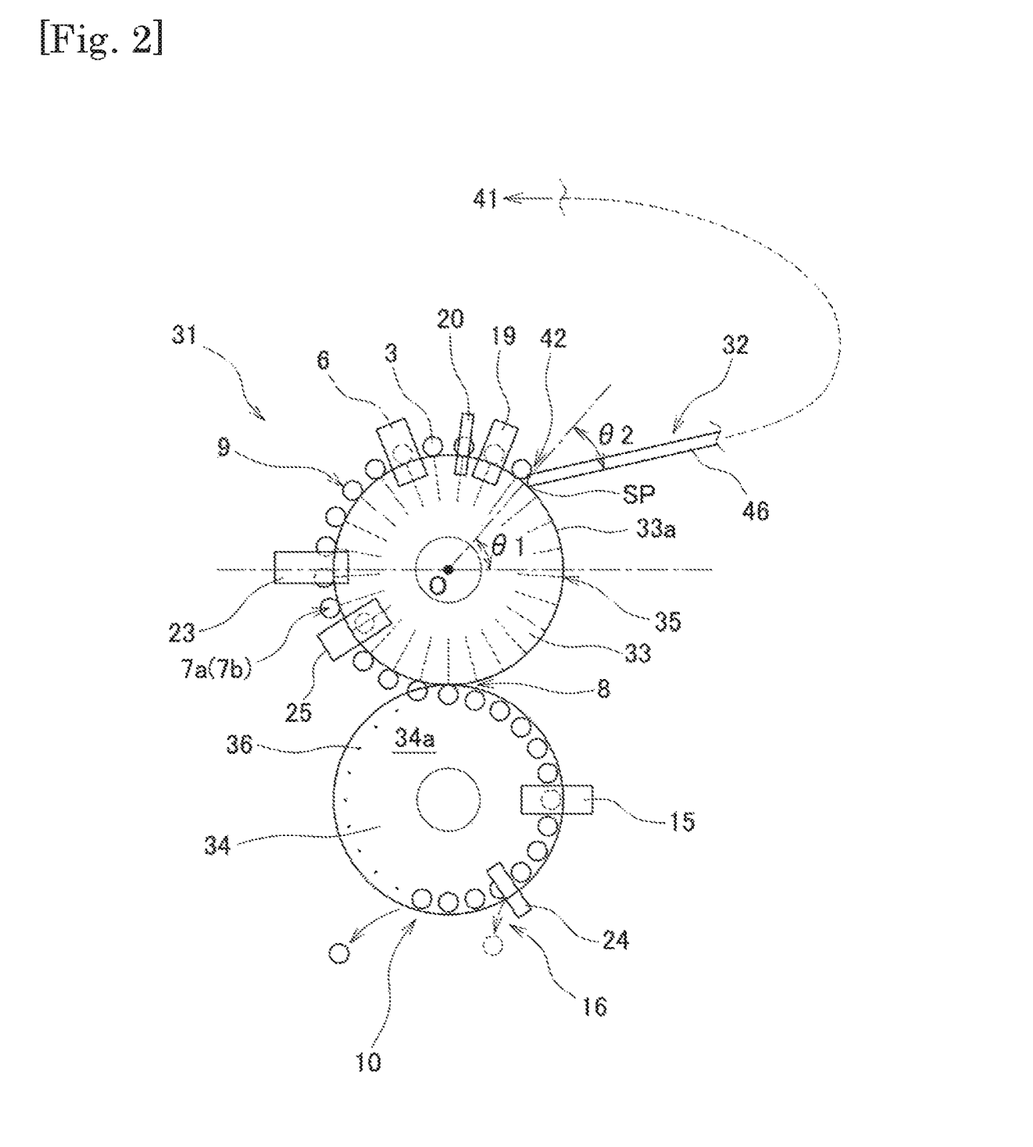
FIG. 2 is an explanatory view illustrating the entire configuration of a tablet printing device according to a second embodiment of the present invention.

Next, a tablet printing device 31 according to a second embodiment of the present invention will be described. FIG. 2 is an explanatory view illustrating the entire configuration of the tablet printing device 31. In the second and subsequent embodiments, the same reference numerals are given to the same or similar member or similar parts, and the description thereof will be omitted.

Also in the tablet printing device 31 according to the second embodiment, as in the above-described tablet printing device 1, print processing is performed while sucking and supporting the side surface 9 of the tablet 3. The tablet printing device 31 is provided with a tablet alignment feeding part 32, a first conveying disk 33, and a second conveying disk 34. The inkjet head 6 is provided near the first conveying disk 33. In the first conveying disk 33, print processing is performed by the inkjet head 6 with the side surface 9 of the tablet 3 sucked to and supported by the first conveying disk 33. The tablet 3 is then transferred to the second conveying disk 34 at the tablet delivery part 8. In the second conveying disk 34, outer appearance of the side surface 9 is inspected with one of the front and back surfaces 7*a* and 7*b* of the tablet 3 held by the second conveying disk 34.

As in the tablet printing device 1, the print surface inspection device 19 that inspects the print surface of the tablet 3 and detects the score line thereof and the powder removing device 20 are provided between the tablet alignment feeding part 32 and the inkjet head 6. The print inspection device 23 and the drying/cooling device 25 are provided at the rear stage of the inkjet head 6 of the first conveying disk 33. On the second conveying disk 34 side, the side surface inspection device 15 that inspects the side surface 9 of the tablet 3, the defective tablet discharge part 16, and the non-defective tablet discharge part 10 are provided.

The first conveying disk 33 has suction holes (suction parts) 35 formed in a disk end surface 33*a* thereof like the conveying disks 4 and 5 of the first embodiment. The tablet is fed in a standing state from the tablet alignment feeding part 32 to the first conveying disk 33. The tablet 3 is held to the end surface 33*a* with the side surface 9 thereof sucked thereto by the suction hole 35. In this state, the inspection of the front and back surfaces 7*a* and 7*b* and the detection of the score line are performed by the print surface inspection device 19. Thereafter, powder on the tablet surface is removed by the powder removing device 20, and then print processing is performed by the inkjet head 6. At this time, the front and back surfaces 7*a* and 7*b* are subjected to print processing at the same time.

After completion of the print processing, a printing state is checked by the print inspection device 23, and then the print is fixed by the drying/cooling device 25. After the processing by the drying/cooling device 25, the tablet 3 is transferred to the second conveying disk 34, and the side surface 9 is inspected by the side surface inspection device 15. The second conveying disk 34 is disposed at a position shifted from the first conveying disk 33 in the axial direction. The second conveying disk 34 has a plurality of suction holes 36 which are formed in the peripheral direction at the outer peripheral portion of a disk surface 34*a* thereof. The suction holes 36 are each formed at a position opposed to the center of the tablet 3 sucked to the end surface 33*a* of the first conveying disk 33. The tablet 3 conveyed to the tablet delivery part 8 by the first conveying disk 33 is sucked by the opposing suction hole 36 of the second conveying disk 34 to be transferred to the second conveying disk 34.

The tablet 3 sucked to the disk surface 34*a* of the second conveying disk 34 is subjected to inspection of the side surface 9 by the side surface inspection device 15. After the side surface inspection, a tablet 3 having no defect in the front and back surfaces 7*a* and 7*b*, in the printing state and in the side surface 9 is discharged through the non-defective tablet discharge part 10. On the other hand, a tablet 3 having a defect is discharged through the defective tablet discharge part 16 as a defective one. As described above, also in the tablet printing device 31 of the second embodiment, print processing is performed while sucking and supporting the side surface 9 of the tablet 3, allowing inspection and print processing to be performed with the print surface fully exposed.

Figure 3:
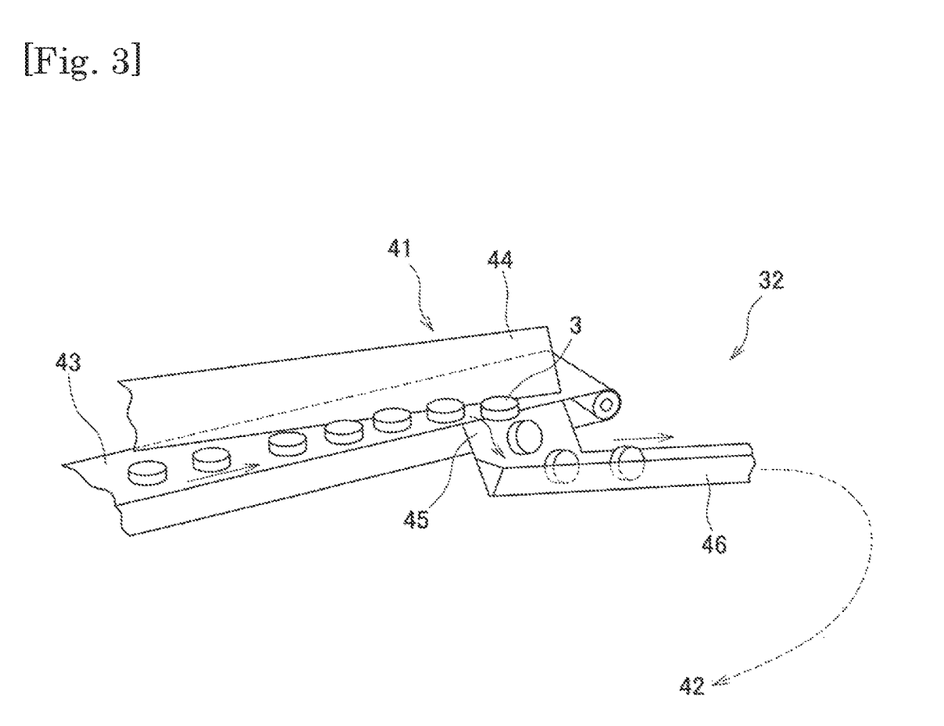
FIG. 3 is an explanatory view illustrating the configuration of a tablet alignment part in the tablet printing device of FIG. 2.

The tablet alignment feeding part 32 of the tablet printing device 31 is provided with a tablet alignment part 41 and a tablet feeding part 42. FIG. 3 is an explanatory view illustrating the configuration of the tablet alignment part 41. As illustrated in FIG. 3, the tablet 3 is conveyed from the hopper 2 to the tablet alignment part 41 by a belt conveyor 43. A guide block 44 and a slide plate 45 are provided at the terminal end of the belt conveyor 43. The tablet 3 reaching the terminal end is pushed out to the slide plate 45 from the guide block 44. The tablet 3 is then slid down on the slide plate 45 with the side surface 9 directed in the vertical direction and introduced into a tablet feeder 46. The tablet feeder 46 has a width that can house only one tablet 3 and is inclined downward toward the first conveying disk 33. The tablets 3 roll in the tablet feeder 46 in a line toward the tablet feeding part 42. At this time, in the tablet printing device 31, the tablets 3 roll to move in the tablet feeder 46. Thus, the contact surface of the tablet 3 against the tablet feeder 46 is relatively changed, so that as compared to a case where the tablet is slid to feed, the tablet is less abraded, preventing the tablet from being deformed due to chipping during the conveyance.

The tablet 3 rolling in the tablet feeder 46 reaches the tablet feeding part 42 and is then fed to the first conveying disk 33, where the side surface 9 thereof is sucked to the disk end surface 33a. At this time, a supply point SP (proximity point between the terminal end of the tablet feeder 46 and the first conveying disk 33) of the tablet 3 in the tablet feeding part 42 is set to a position of an angle θ1 (about 30° to 60°) with respect to the horizontal direction (supply point angle position). The inclination angle of the tablet feeder 46 is set to an angle θ2 (about 0° to 30°) with respect to a line connecting a center O of the first conveying disk 33 and the tablet supply point SP (tablet entry angle at the supply point). By thus setting the angles θ1 and θ2, the tablets 3 can be continuously fed using gravity. Further, the force for one tablet 3 to push its adjacent tablet 3 becomes the angular component of gravity, so that the force for pushing the tablet becomes smaller than in a case where the tablet 3 is fed in the vertical direction. As a result, the tablet 3 is smoothly fed to the first conveying disk 33 without being applied with an excessive load.

Figure 4A:
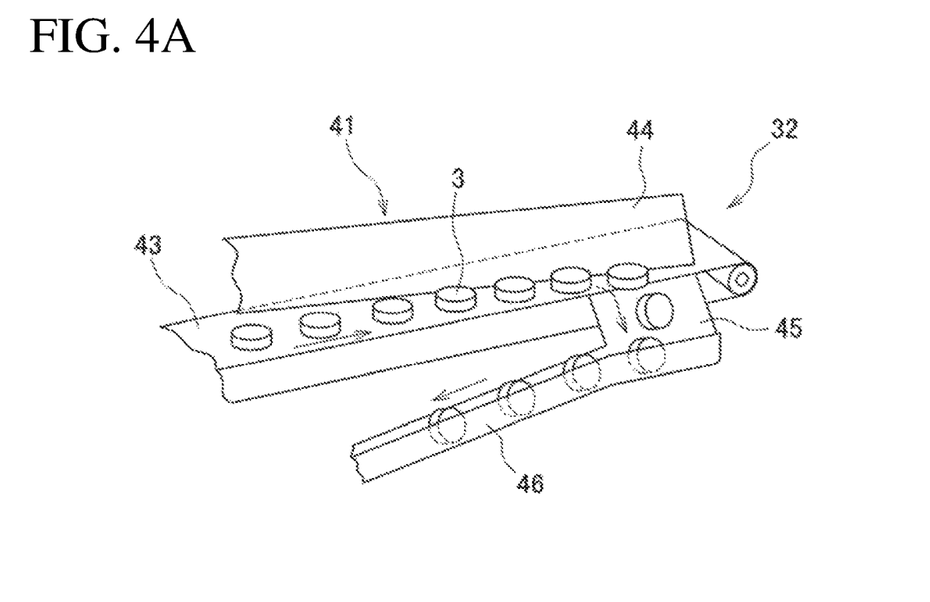
FIGS. 4A and 4B are explanatory views each illustrating a modification of the tablet alignment part.
Figure 4B:
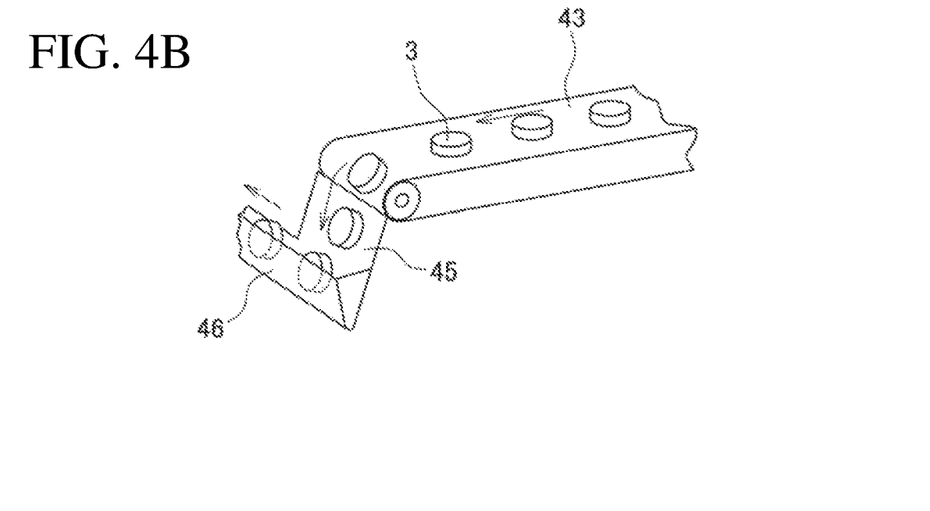

The tablet alignment part 41 can adopt structures as illustrated in FIGS. 4A and 4B other than the structure illustrated in FIG. 3. In the structure of FIG. 4A, the tablet 3 slid down from the belt conveyor 43 is reversed in traveling direction by 180° to be fed to the first conveying disk 33. By thus changing the tablet traveling direction, the occupancy area of the device can be reduced as compared to a device having a structure in which the tablet traveling direction is kept unchanged, resulting in reduction in the device size. In the structure of FIG. 4B, unlike the structures of FIG. 3 and FIG. 4A, the tablet is slid down toward the front of the belt conveyor 43. This provides other layout variations of the conveyor, thus enhancing the degree of freedom of device design.

(Third Embodiment)

Figure 5:
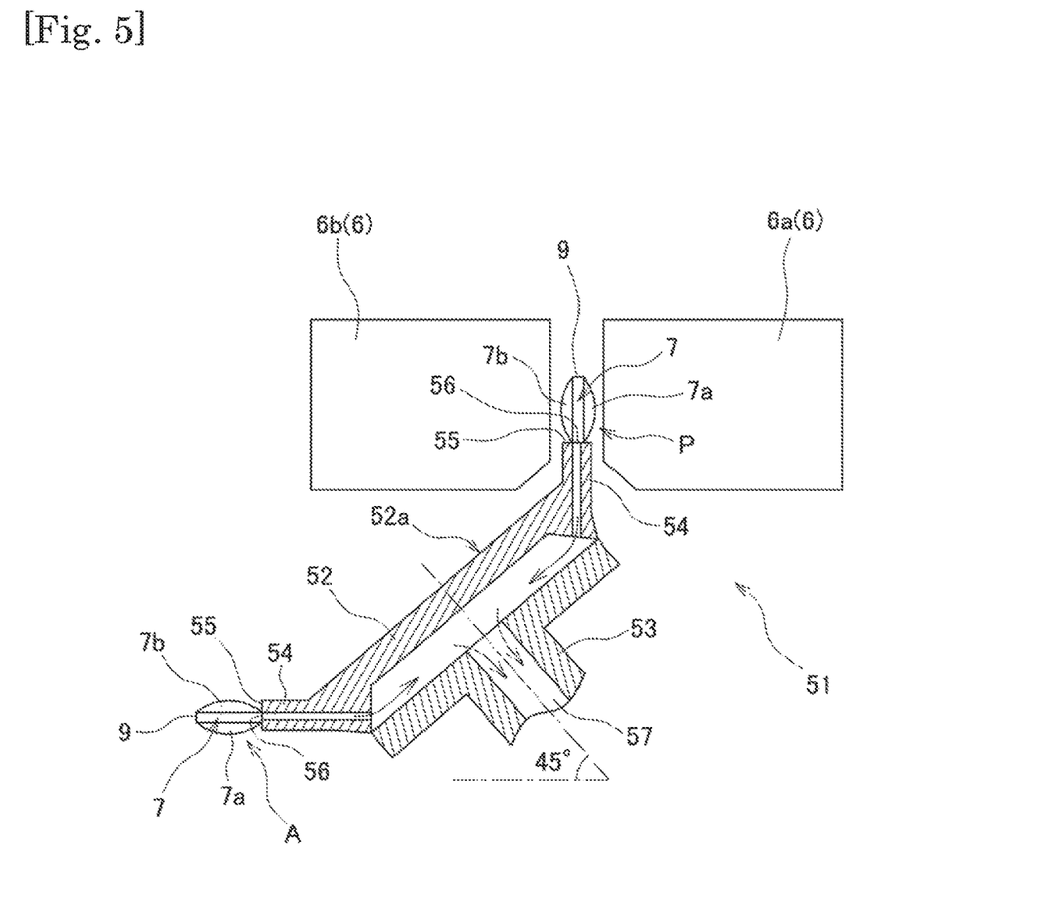
FIG. 5 is an explanatory view illustrating the configuration of a conveying disk used in a tablet printing device according to a third embodiment of the present invention.

FIG. 5 is an explanatory view illustrating the configuration of a tablet printing device 51 according to a third embodiment of the present invention. In the tablet printing device 51, the conveying disk 52 is disposed in an inclined state. Although two conveying disks are used in the above embodiments, only one conveying disk 52 is used in the tablet printing device 51 of the present embodiment. The conveying disk 52 is disposed such that a rotation axis 53 thereof is inclined at 45° with respect to the horizontal direction. A flange part 54 is formed around the conveying disk 52 so as to be inclined at 45° with respect to a disk surface 52a. As a result, as illustrated in FIG. 5, the flange part 54 extends in the vertical direction at the upper portion of the conveying disk 52, while the flange part 54 extends in the horizontal direction at the lower portion of the conveying disk 52. The inkjet head 6 is provided at the disk upper portion (printing position P) where the flange part 54 extends in the vertical direction. The disk lower portion (suction position A) where the flange part 54 extends in the horizontal direction is connected to the tablet feeding part 12 of the vibration feeder 11.

A plurality of suction holes (suction parts) 56 are formed in the peripheral direction in the end surface of the conveying disk 52, i.e., an end surface 55 of the flange part 54. A flow path 57 for suction air is formed in the conveying disk 52. The flow path 57 is connected to a suction device (not illustrated). In the tablet printing device 51, the tablet 3 is sucked to the end surface 55 of the conveying disk 52 at the suction position and moved upward with rotation of the conveying disk 52 to be conveyed to the printing position. At the printing position, the inkjet head 6 applies print processing to the front and back surfaces 7a and 7b of the tablet 3. Then, after completion of the print processing, the tablet 3 is conveyed by about ¼ rotation and released and discharged from the conveying disk 52 at the non-defective tablet discharge part 10. Also in the tablet printing device 51, the side surface inspection device 15, print surface inspection device 19, and powder removing device 20 are provided between the suction position and the printing position. Further, the print inspection device 23, defective tablet discharge part 16, and drying/cooling device 25 are provided between the printing position and the non-defective tablet discharge part 10.

In the tablet printing device 51, by disposing the conveying disk 52 in an inclined state, both the suction position and the printing position can be disposed within one rotation of the disk, thereby making it possible to perform tablet print processing with a single conveying disk. This can simplify the device configuration and reduce the device size. Further, the tablet need not be transferred from one conveying disk to another, so that it is possible to avoid a risk of transfer failure and to eliminate the need of synchronization control between two disks or adjustment of a clearance therebetween.

(Fourth Embodiment)

Figure 7:
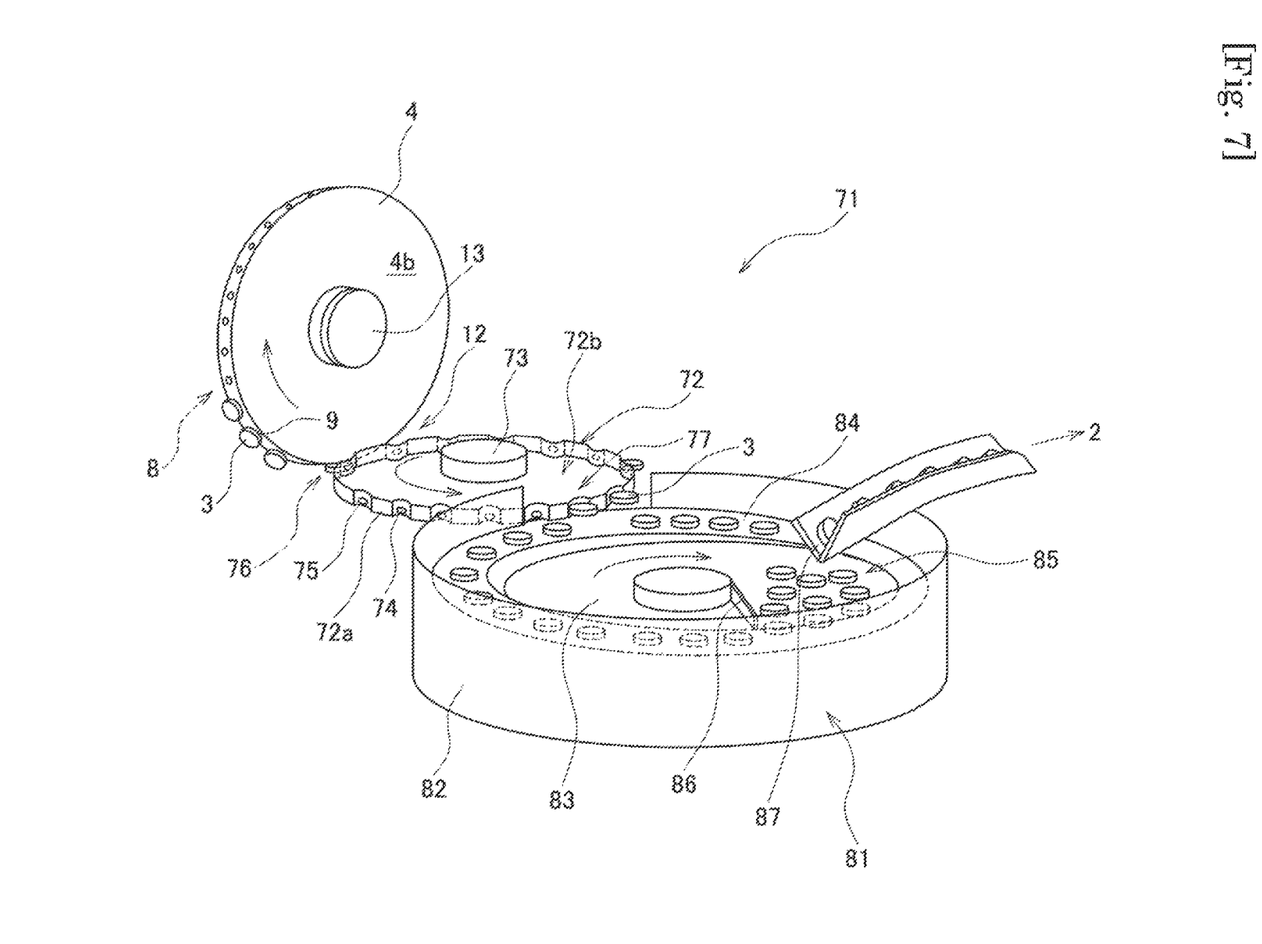
FIG. 7 is an explanatory view illustrating the configuration of a tablet feeding part in a tablet printing device according to a fourth embodiment of the present invention.

FIG. 7 is an explanatory view illustrating the configuration of the tablet feeding part 12 in a tablet printing device 71 according to a third embodiment of the present invention. A part downstream of the tablet feeding part 12 of the tablet printing device 71 has the same configuration as that in the first embodiment (FIG. 1). As illustrated in FIG. 7, in the tablet printing device 71, another conveying disk (tablet feeding disk 72) is provided at the front stage of the tablet feeding part 12 as a tablet feeding unit. The tablet 3 is sucked to the tablet feeding disk 72 at its side surface 9 and conveyed to the tablet feeding part 12 in a horizontal posture (in a state where the front and back surfaces 7a and 7b face upward and downward in the vertical direction). Unlike in the tablet printing device 1 according to the first embodiment, the tablet feeding part 12 of the present embodiment has a guideless structure where the tablet 3 is conveyed with no guide member and can thus be flexibly applied to tablets of various sizes.

The tablet feeding disk 72 is disposed with a disk surface 72b thereof made almost parallel to the horizontal direction. The disk 72 is rotated about a rotation axis 73 extending in the vertical direction in a direction denoted by the arrow by a drive source (not illustrated). As illustrated in FIG. 1, the conveying disks 4 and 5 provided at the rear stage of the tablet feeding part 12 are disposed with the disk surfaces 4b and 5b thereof made parallel to the vertical direction. On the other hand, the tablet feeding disk 72 of the tablet printing device 71 is disposed with its disk surface 72b made parallel to the horizontal direction like a turn table.

An end surface 72a of the tablet feeding disk 72 has circular suction holes (suction parts) 74 arranged in the peripheral direction. Unlike the conveying disks 4 and 5, the end surface 72a has concave portions 75 into each of which the tablet 3 is introduced near the suction holes 74. The end surface 72a of the tablet feeding disk 72 adjacently faces the end surface 4a of the conveying disk 4 in an orthogonal state. In the tablet printing device 71, a tablet delivery part 76 (first tablet delivery part) is formed also between the tablet feeding disk 72 and the conveying disk 4. The tablet feeding disk 72 is also synchronously driven with the conveying disks 4 and 5 so that the tablet conveying speed in the tablet feeding disk 72 coincides with that in the conveying disks 4 and 5 for transfer of the tablet therebetween. The same concave portions may be formed in the end surfaces 4a and 5a of the conveying disks 4 and 5, and the end surface 72a may be formed as a flat surface with no projection as the conveying disks 4 and 5.

A tablet acquisition part 77 for receiving the tablet 3 from a rotary feeder (tablet feeder) 81 is provided at the turning part of the tablet feeding disk 72. In the tablet printing device 71, the tablet acquisition part 77 is disposed upstream of the tablet feeding part 12 (side opposite to the tablet delivery part 12 in the rotation direction of the tablet feeding disk 72). The rotary feeder 81 is so-called a vibrationless rotary part feeder and has a configuration in which a rotary disk 83 and an annular rotary plate 84 are coaxially provided in a cylindrical casing 82. The outer periphery of the casing 82 is partially cut out, and the tablet feeding disk 72 is disposed so as to face the cut-out portion to form the tablet acquisition part 77. The annular rotary plate 84 is disposed immediately inside the casing 82, and the rotary disk 83 is disposed inside the annular rotary plate 84 in an inclined state. A part of the outer periphery of the rotary disk 83 has the same height as the height of the annular rotary plate 84 and serves as a communication part 85 between the rotary disk 83 and the annular rotary plate 84. The communication part 85 is provided with a guide plate 86 for guiding the tablets on the rotary disk 83 toward the annular rotary plate 84 side.

The tablet 3 from the hopper 2 is fed from a tablet throwing part 87 onto the rotating rotary disk 83. The tablet 3 on the rotary disk 83 is moved in the peripheral direction with rotation of the rotary disk 83. The tablet 3 reaching the communication part 85 is moved to the annular rotary plate 84 side rotated in the same speed as that of the rotary disk 83 by the guide plate 86. The tablet 3 on the annular rotary plate 84 is moved in the peripheral direction with rotation of the annular rotary plate 84 to be fed to the tablet acquisition part 77. The tablet 3 fed to the tablet acquisition part 77 faces the end surface 72a of the rotating tablet feeding disk 72. At this time, a tablet 3 coinciding in posture and timing with the suction hole 74 is sucked to the suction hole 74 while being fitted in the concave portion 75. In the tablet feeding disk 72, the tablet 3 is sucked to the end surface 72a in a horizontal posture.

The tablet 3 sucked to the tablet feeding disk 72 at the tablet acquisition part 77 is moved to the tablet feeding part 12 with rotation of the tablet feeding disk 72 while maintaining the horizontal posture. The tablet 3 reaching the tablet feeding part 12 is transferred from the tablet feeding disk 72 to the conveying disk 4 at the tablet delivery part 76. The tablet 3 sucked to the end surface 4a of the conveying disk 4 is subjected to processing such as inspection and printing in the same manner as above. That is, the tablet 3 is put into a vertical posture (a state where the side surface 9 is directed in the vertical direction) from the horizontal posture with rotation of the conveying disk 4, subjected to the side surface inspection, and fed to the tablet delivery part 8. The tablet 3 is then transferred to the conveying disk 5 at the tablet delivery part 8, conveyed while maintaining the vertical posture, and subjected to print processing after the print surface inspection and powder removal.

On the other hand, a tablet 3 not coinciding in posture and timing with the suction hole 74 and thus not sucked to the suction hole 74 is returned onto the rotating rotary disk 83. In the tablet printing device 71, the tablet 3 sucked in a proper posture is fed to the tablet feeding part 12 by the tablet feeding disk 72 and is then subjected to the following processing, while the tablet 3 that does not assume a proper posture is returned to the rotary feeder 81 and is then automatically conveyed toward the tablet feeding part 12 again (automatic return/automatic retry).

As described above, in the tablet printing device 71, the tablet 3 is sucked and conveyed from the rotary feeder 81 to the tablet feeding part 12 using the tablet feeding disk 72, so that the tablet 3 can be picked up in a guideless configuration to be fed to the conveying disk 4. In the tablet printing device 1 according to the first embodiment (FIG. 1), the conveying guide 29 matching the tablet size is provided between the vibration feeder 11 and the tablet feeding part 12, and the tablets 3 are aligned along the conveying guide 29 so as to be fed to the tablet feeding part 12. Accordingly, the conveying guide 29 needs to be exchanged when the tablet size is changed. In this case, as a matter of course, a guide having a size smaller than that of the tablet cannot be used, and a guide having a size excessively larger than the tablet size may destabilize the flow of the tablet or supply position. Thus, it is necessary to use a dedicated guide matching the tablet size as the conveying guide 29.

In recent years, medicines, such as generic medicines, having the same active ingredients but having different size or shape are widely accepted in the market. Further, tablets of various sizes different in dose exist as medicines of the same kind. In a device using the conveying guide, when the tablet size is changed, part replacement is required regardless of whether the ingredients of the tablet are the same or not. Thus, every time the size of the tablet is changed, it is necessary to stop the device and perform replacing/cleaning work, taking much labor and time. When tablets differ in size, the above work takes the same labor and time even when they are completely the same medicine. Thus, a device capable of performing print processing irrespective of the tablet size has been desired to be developed.

On the other hand, in the tablet printing device 71, the tablet 3 is fed to the tablet feeding part 12 not using the conveying guide, but using the tablet feeding disk 72, so that the tablet can be fed to the rear stage in a proper posture irrespective of the tablet size as long as the tablet can be sucked to the disk. Thus, tablets of the same component having various sizes can be conveyed in a time, thereby significantly improving processing efficiency. As described in the first embodiment, the tablet printing device according to the present invention performs print processing while the rear stage conveying disks 4 and 5 performs sucking/conveying, so that it is also possible to achieve desired printing irrespective of the tablet size. That is, using the tablet feeding disk 72 allows achievement of effective print processing maximally exerting the features of the device.

Further, the tablet printing device 71 is not provided with the conveying guide, so that replacement or cleaning thereof need not be performed, thereby reducing man-hours for device maintenance. Further, the arrangement pitch of the suction holes 74 is previously determined, so that it is possible to prevent a larger number of tablets than the processing capacity from being fed, which in turn prevents problems due to jamming of the tablets.

The present invention is not limited to the above-described embodiments and may be modified in various ways within the scope of the invention.

For example, although circular tablets are subjected to print processing in the above embodiments, the tablet printing device according to the present invention may be applied not only to the circular tablets, but also to various types of tablets such as oblong tablets, caplets, and polygon-shaped tablets. Further, print processing can be applied not only to the tablets, but also to capsules (hard, soft). Thus, the "tablet" in the present invention is a concept that includes not only so-called circular tablets, but also tablets or capsules of various shapes.

Figure 8:
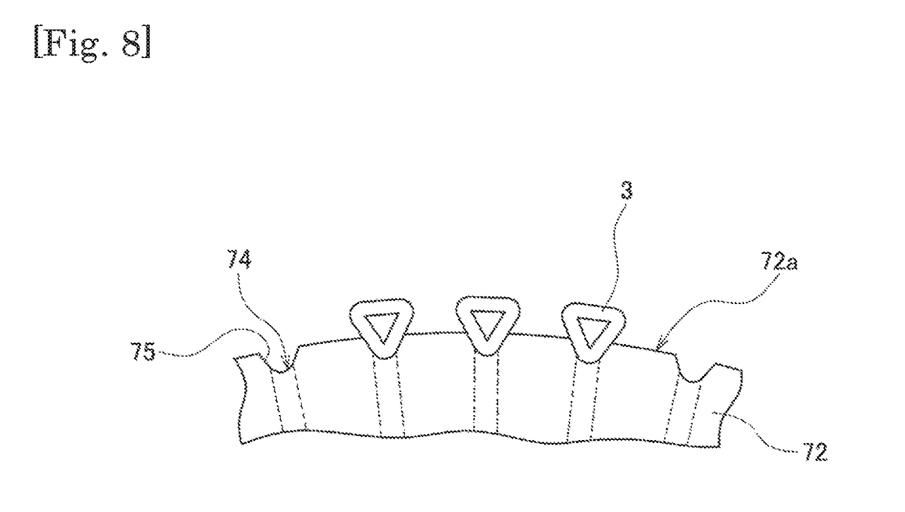
FIG. 8 is an explanatory view illustrating a modification of the conveying disk.

Further, the shape of the suction hole formed in the conveying disk of the above embodiments is not limited to a circular shape, but may be an elliptical or polygonal shape. Further, a curved suction groove having an inner peripheral surface matching the tablet outer shape may be formed together with the suction hole. In that case, as the shape of the suction groove, various shapes such as a V- or U-like shape or a quadrangular shape may be adopted. For example, a substantially V-like shaped groove as illustrated in FIG. 8 may be formed in the tablet feeding disk 72 so as to correspond to tablets having peculiar shapes, such as triangular ones. The most common shape of the tablet is a disk shape, and thus the groove of the tablet feeding disk is desirably formed into a curved shape to which the tablets slightly different in size can be fitted.

INDUSTRIAL APPLICABILITY

The present invention may be applied to printing for medical tablets, but also for food such as confectionary having a tablet shape.

REFERENCE SIGNS LIST

1: Wiper system
2: Brushless motor
1: Tablet printing device
2: Hopper
3: Tablet
4: Conveying disk (first conveying disk: conveying unit)
4a: End surface
4b: Disk surface
5: Conveying disk (second conveying disk: conveying unit)
5a: End surface
5b: Disk surface
6: Inkjet head (printing unit)
6a: Inkjet head for front surface
6b: Inkjet head for back surface
7a: Tablet front surface
7b: Tablet back surface
8: Tablet delivery part
9: Tablet side surface
10: Non-defective tablet discharge part
11: Vibration feeder
12: Tablet feeding part
13: Rotation axis
14: Suction hole
15: Side surface inspection device
16: Defective tablet discharge part
17: Rotation axis
18: Suction hole (suction part)
19: Print surface inspection device
20: Powder removing device
21: Nozzle
22: Suction tube
23: Print inspection device
24: Jet nozzle
25: Drying/cooling device
26: Carrying-out path
27: Heating nozzle
28: Cooling nozzle
29: Conveying guide
31: Tablet printing device
32: Tablet alignment feeding part
33: First conveying disk (conveying unit)
33a: End surface
34: Second conveying disk (conveying unit)
34a: Disk surface
35: Suction hole (suction part)
36: Suction hole
41: Tablet alignment part
42: Tablet feeding part
43: Belt conveyor
44: Guide block
45: Slide plate
46: Tablet feeder
51: Tablet printing device
52: Conveying disk (conveying unit)
52a: Disk surface
53: Rotation axis
54: Flange part
55: End surface
56: Suction hole (suction part)
57: Flow path
60: Tablet delivery guide
61: Removing part
62a: Posture stabilizing guide for tablet front surface
62b: Posture stabilizing guide for tablet back surface
71: Tablet printing device
72: Tablet feeding disk
72a: End surface
72b: Disk surface
73: Rotation axis
74: Suction hole
75: Concave part
76: Tablet delivery part
77: Tablet acquisition part
81: Rotary feeder
82: Casing
83: Rotary disk
84: Annular rotary plate
85: Communication part
86: Guide plate
87: Tablet throwing part
90: Controller
SP: Tablet supply point

The invention claimed is:

1. A tablet printing device comprising:
a conveying unit that conveys a tablet while supporting the side surface of the tablet;
a printing unit that is disposed in proximity to the conveying unit and capable of applying print processing to at least one of the front and back surfaces of the tablet conveyed by the conveying unit; and
a tablet feeding part connected to a tablet feeding unit and that receives the tablet from the tablet feeding unit, wherein
the conveying unit comprises at least one conveying disk formed into a disk shape, the at least one conveying disk having suction parts formed in the end surface thereof in the peripheral direction and sucking at least one of the surfaces of the tablet, the at least one conveying disk further comprising a first conveying disk that is disposed so as to face the tablet feeding part and conveys the tablet while sucking one of the front and back surfaces of the tablet, and a second conveying disk that is provided in proximity to the first conveying disk such that the end surface thereof adjacently faces the end surface of the first conveying disk and conveys the tablet while sucking the side surface of the tablet, and a tablet delivery part at which the tablet is transferred from the first conveying disk to the second conveying disk is provided between the first and second conveying disks.

2. The tablet printing device according to claim 1, wherein the conveying unit is capable of sucking and supporting the side surface of the tablet such that the front and back surfaces of the tablet are each fully exposed.

3. The tablet printing device according to claim 1, wherein the printing unit is capable of applying print processing to the front and back surfaces of the tablet at the same time.

4. The tablet printing device according to claim 1, further comprising a print surface inspection device capable of detecting a score line formed in the tablet, wherein the printing unit applies print processing to the front and back surfaces of the tablet such that the direction of characters printed on the front surface of the tablet and that printed on the back surface coincide with each other according to the direction of the score line detected by the print surface inspection device.

5. A tablet printing device comprising:

a conveying unit that conveys a tablet while supporting the side surface of the tablet;

a printing unit that is disposed in proximity to the conveying unit and capable of applying print processing to at least one of the front and back surfaces of the tablet conveyed by the conveying unit; and a tablet feeding part connected to a tablet feeding unit and that receives the tablet from the tablet feeding unit, wherein the conveying unit comprises at least one conveying disk formed into a disk shape, the at least one conveying disk having suction parts formed in the end surface thereof in the peripheral direction and sucking at least one of the surfaces of the tablet, the at least one conveying disk further comprising a first conveying disk that is disposed so as to face the tablet feeding part and conveys the tablet while sucking one of the front and back surfaces of the tablet, and a second conveying disk that is provided in proximity to the first conveying disk such that the end surface thereof adjacently faces the end surface of the first conveying disk and conveys the tablet while sucking the side surface of the tablet, and the tablet feeding unit has a tablet feeding disk that conveys the tablet while sucking the side surface of the tablet, the tablet feeding disk sucks the tablet at a tablet acquisition part and conveys the tablet to the tablet feeding part in a horizontal posture, and a tablet delivery part at which the tablet is transferred from the tablet feeding disk to the first conveying disk is provided between the tablet feeding disk and the first conveying disk.

\* \* \* \* \*